United States Patent [19]

Asada

[11] Patent Number: 5,105,077
[45] Date of Patent: Apr. 14, 1992

[54] LASER BEAM SCANNING POSITION DETECTING DEVICE HAVING MEANS FOR DETERMINING PRINT START TIMING

[75] Inventor: Kenichirou Asada, Tokyo, Japan

[73] Assignee: Ricoh Company, Ltd., Tokyo, Japan

[21] Appl. No.: 561,784

[22] Filed: Aug. 1, 1990

[30] Foreign Application Priority Data

Aug. 1, 1989 [JP] Japan .................. 1-197943

[51] Int. Cl.⁵ .............................................. G01J 1/32
[52] U.S. Cl. .................................. 250/205; 250/235
[58] Field of Search .................. 250/205, 235, 236; 346/108; 358/481, 480, 496, 497; 350/6.8, 6.6

[56] References Cited

U.S. PATENT DOCUMENTS

| | | | |
|---|---|---|---|
| 3,827,428 | 6/1989 | Takagi et al. ................ | 250/205 |
| 4,443,695 | 4/1984 | Kitamura ..................... | 250/205 |
| 4,659,714 | 9/1987 | Kimizuka et al. ............ | 250/205 |
| 4,757,191 | 7/1988 | Shimada et al. ............. | 250/235 |
| 4,831,247 | 5/1989 | Ishizaka ...................... | 250/236 |
| 4,856,011 | 8/1989 | Shimada et al. ............. | 250/205 |
| 4,879,459 | 11/1989 | Negishi ........................ | 250/205 |
| 5,001,341 | 3/1991 | Negishi ........................ | 250/235 |

Primary Examiner—David C. Nelms
Assistant Examiner—Michael Messinger
Attorney, Agent, or Firm—Oblon, Spivak, McClelland, Maier & Neustadt

[57] ABSTRACT

A laser beam scanning position detecting device having a beam detecting element for detecting the passage of a laser beam, and determining a print start timing in response to an output signal of the beam detecting element. The print start timing is changed in response to a reference signal or externally derived data.

13 Claims, 17 Drawing Sheets

LASER BEAM SCANNING POSITION DETECTING DEVICE HAVING MEANS FOR DETERMINING PRINT START TIMING

BACKGROUND OF THE INVENTION

The present invention relates to a laser beam printer and, more particularly, to a laser beam scanning position detecting device for determining a print start timing in response to an output signal of a beam detector which is responsive to the passage of a laser beam.

A laser beam printer extensively used today has a photodetector such as a photodiode for determining a write start position in the main scanning position, and determines it by using a positive-going edge of the output signal of the photodetector as a reference. The problem with such a printer is that when the laser power is changed, as often intentionally done to compensate for changes in process conditions, the write start position is shifted. To eliminate this problem, there has been proposed a method which counts the pulse width of an output pulse of a photodetector and determines a write start position on the basis of the count, as disclosed in Japanese patent laid-open publication No. 25363/1986. Alternatively, the intensity of a laser beam may be detected and fed back to a waveform shaping circuit, as taught in Japanese patent laid-open publication No. 233614/1985. Another implementation is such that pulses indicative of a write start position are generated in response to detected intensity of a laser beam, as shown and described in Japanese patent laid-open publication No. 49962/1983. However, the pulse width counting scheme mentioned first cannot attain satisfactory accuracy unless a clock for counting has a frequency which is accuracy unless a clock for counting has a frequency which is high enough to lie in an allowable range with respect to the write errors. The second-mentioned intensity feedback scheme has a drawback that an extra period of time is needed to detect the intensity of a laser beam and the circuitry is complicated. Further, the third-mentioned pulse generating scheme is greatly influenced by an integrating circuit and is complicated in construction.

With a laser printer, digital copier or similar image recorder of the type manipulating a beam-like light source, it is a common practice to fix image forming conditions on a type-of-machine basis at the time of shipment. The image forming conditions include image forming speeds and magnification change ratios (pertaining to the type which changes magnification by changing the frequency of a video clock). However, it is often desired to change, among the same type of machine, the image forming conditions to change the number of recordings, or the change the video frequency or the beam scanning speed to change the magnification. In such a case, correction is needed since the sensitivity of a photoconductive element, for example, changes due to aging although the image forming conditions may be fixed. Among the various image forming conditions, the intensity of a scanning beam may effective for the compensation.

On the other hand, to determine a write start position accurately, it has been customary to provide a beam detector on a scanning line. The output signal of the beam detector is amplified and waveform-shaped to serve as a syncronizing pulse, so that the write start position is determined on the basis of the synchronizing pulse. However, a change in laser power introduces an error in the write start position. The shift of the write start position is not conspicuous so long as an image is monochromatic. However, when it comes to an image recorder of the type manipulating a plurality of beams and, therefore, having a plurality of beam detectors, the error in the write start position occurs with each of the beams. Especially, when a plurality of colors are printed one upon another to form a composite color image, the image quality is critically lowered due to color difference.

SUMMARY OF THE INVENTION

It is therefore an object of the present invention to provide a laser beam scanning position detecting device which allows high quality images with no write start position errors to be produced stably.

It is another object of the present invention to provide a generally improved laser beam scanning position detecting device.

In accordance with the present invention, a laser beam scanning position detecting device having a beam detecting element for detecting the passage of a laser beam, and determining a print start timing in response to an output signal of the beam detecting element comprises a photodetector for detecting an output of the laser beam, a comparator for comparing an output signal of the photodetector with a reference signal which is variable in response to externally derived data, an output control for controlling an output of the laser beam in response to an output signal of the comparator, and a print start timing changing circuit for changing a print start timing in response to the reference signal.

Also, in accordance with the present invention, a laser beam scanning position detecting device having a beam detecting element for detecting the passage of a laser beam, and determining a print start timing in response to an output signal of the beam detecting element, comprises an output control for controlling an output of the laser beam in response to externally derived data, and a print start timing changing circuit for changing a print start timing in response to the externally derived data.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
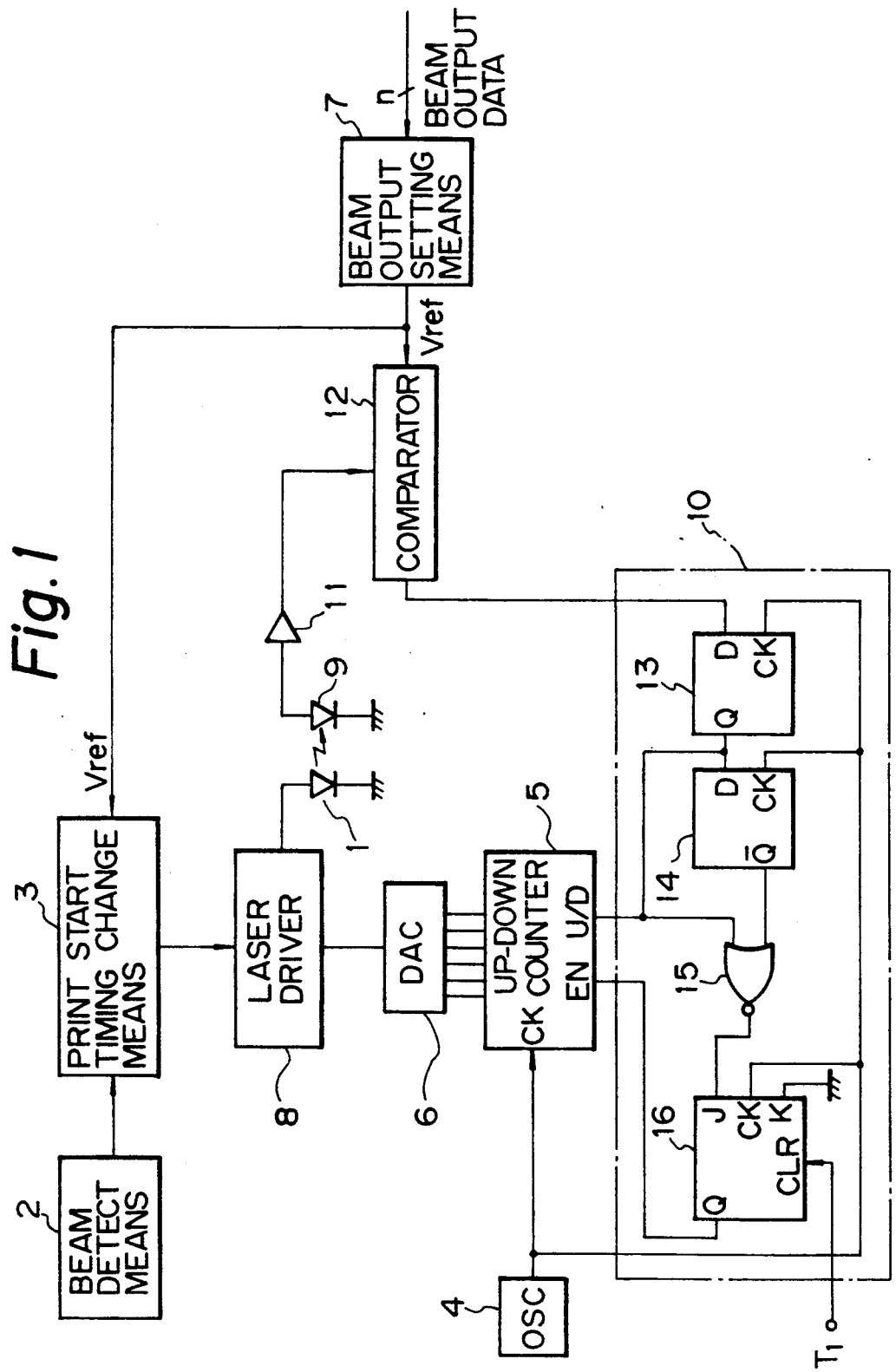
FIG. 1 is a block diagram schematically showing a laser beam scanning position detecting device embodying the present invention.

Referring to FIG. 1 of the drawings, a detecting device embodying the present invention is shown. There are shown in FIG. 1 a semiconductor laser 1, beam detecting means 2, print start timing changing means 3, an oscillator 4, an up-down counter 5, a digital-to-analog converter (DAC) 6, beam output setting means 7, a laser driver 8, a photodetector 9, an edge detecting circuit 10, an amplifier 11, a comparator 12, D flip-flops 12 and 14, a NOR gate 15, and a JK flip-flop 16.

To better understand the illustrative embodiment, a specific system for controlling the laser beam output and a specific procedure for changing laser power will be described.

Figure 2:
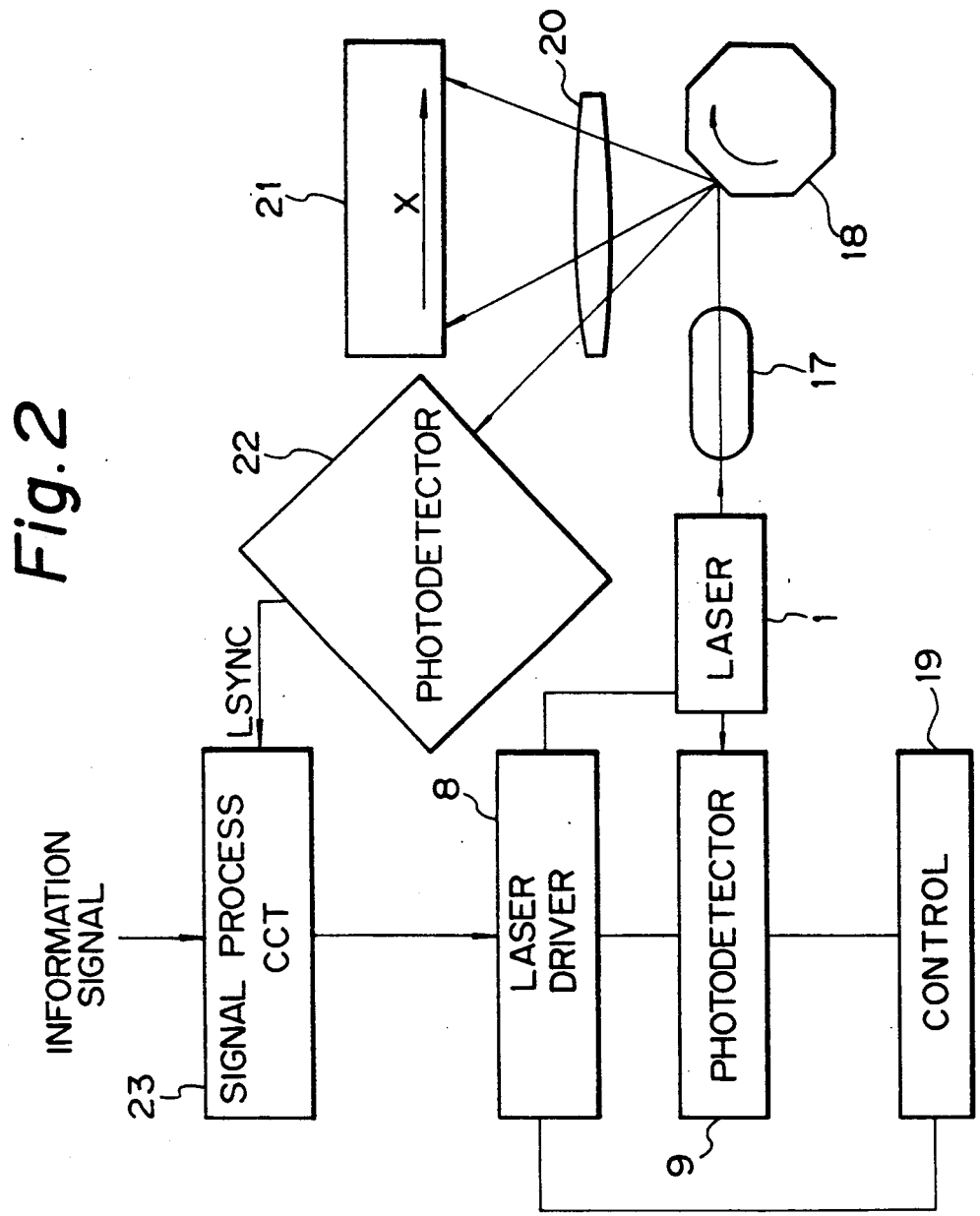
FIG. 2 is a block diagram schematically showing a laser printer to which the present invention is applicable.

FIG. 2 shows a specific construction of a laser printer to which the present invention is applicable. In the figure, a laser beam issuing from a semiconductor laser 1 is collimated by a collimating lens 17, deflected by an optical scanning unit 18 implemented as a rotary polygonal mirror, and then focused by an f-theta lens 20 onto the charged surface of a photoconductive element 21. As the scanning unit 18 is rotated, the beam spot on the photoconductive element 21 reciprocatingly scans the element 21 in the main scanning direction as indicated by an arrow x. At the same time, the photoconductive element 21 is rotated to effect subscanning. A photodetector 22 is located outside a predetermined information writing range as seen in the axial direction of the photoconductive element 21. By detecting the laser beam deflected by the scanning unit 18, the photodetector 22 generates a synchronizing signal, i.e., a line sync signal LSYNC. A signal processing circuit 23 applies an information signal or video data to a laser driver 8 at particular timings in response to the synchronizing signals fed thereto from the photodetector 22.

The laser driver 8 drives the laser 1 in response to the information signal from the signal processing circuit 23. Hence, a laser beam modulated by the information signal scans the photoconductive element 21 to electrostatically form a latent image thereon. The latent image is developed by a developing unit, not shown, and then transferred to a paper sheet or similar medium by an image transferring unit, not shown.

A laser beam issuing rearward from the laser 1 is incident to a photodetector 9 and has its intensity detected thereby. A controller 19 controls the laser driver 8 in response to an output signal of the photodetector 9 in such a manner as to maintain the amount of output beam of the laser 1 constant. Detecting the intensity of the rearwardly issuing beam by use of the photodetector 9 is advantageous over steering a part of a beam issuing forward to a photodetector in that it does not lower the intensity of the beam actually available.

Figure 3:
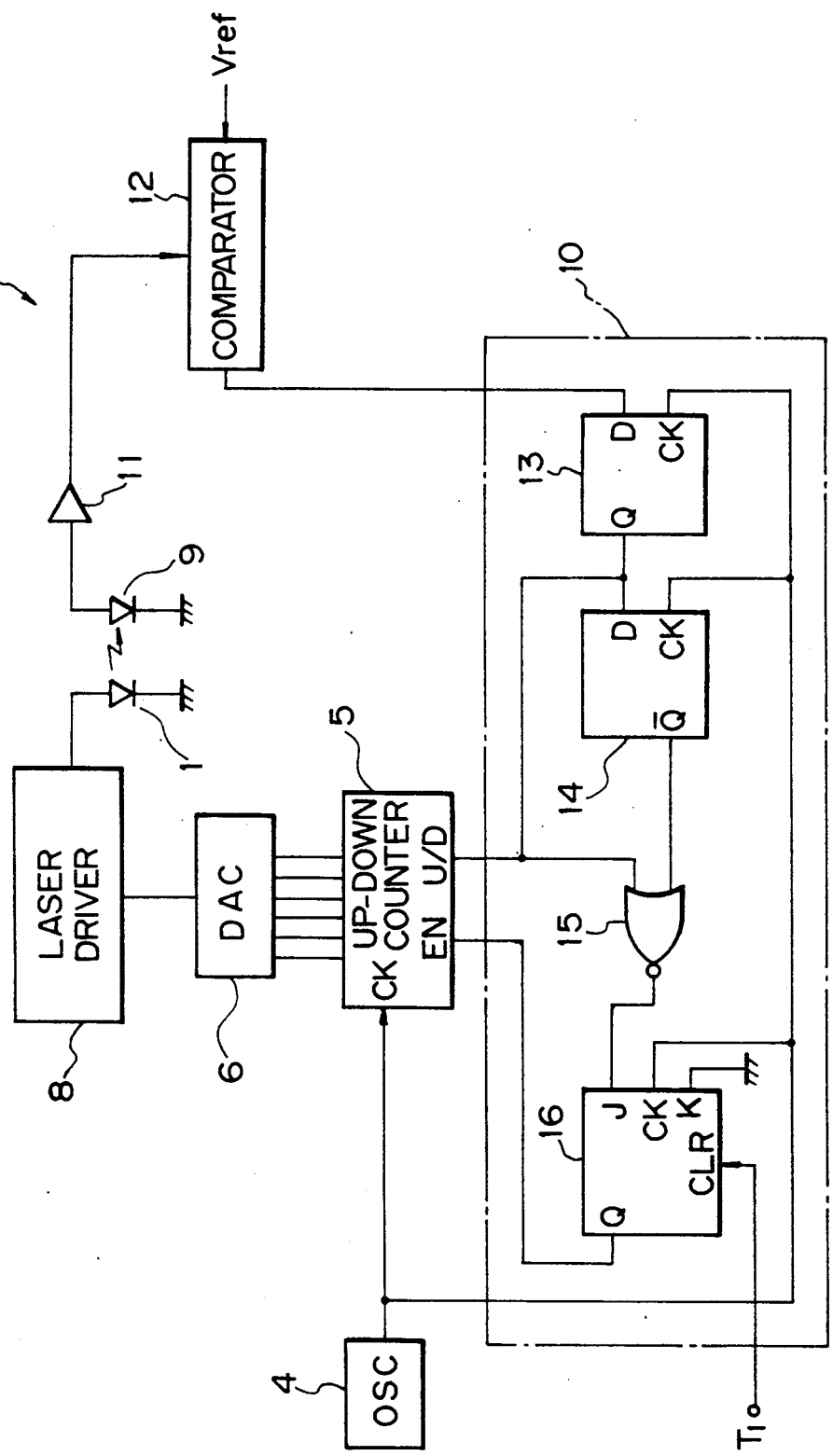
FIG. 3 is a block diagram schematically showing a specific construction of a controller included in the printer of FIG. 2.

FIG. 3 shows a specific construction of the control circuit 19. As shown, when a timing signal $T_1$ for starting an output control procedure arrives, a JK flip-flop 16 is cleared to turn the output thereof to a low level or "L" and thereby enables an up-down counter 5. The output of a comparator 12 is latched by a D flip-flop 13 in response to a clock fed from an oscillator 4. The output of the D flip-flop 13 is in turn fed to the up-down counter 5 as a count mode signal, thereby controlling the count mode of the counter 5. At the same time, the output of the D flip-flop 13 is latched by a D flip-flop 14 in response to the clock from the oscillator 4. The non-inverting output of the D flip-flop 13 and the inverting output of the D flip-flop 14 are coupled to a NOR gate 15. The JK flip-flop 16 is set by an output of the NOR gate 15.

The output of the photodetector 9 representative of the intensity of the incident beam is amplified by an amplifier 11 and then compared by the comparator 12 with a reference voltage Vref. Based on the result of comparison, the comparator 12 produces a high level or a low level signal. Assuming that the output of the comparator 12 is in a high level, i.e., the output of ths laser 1 is higher than the reference voltage Vref, then the up-down counter 5 enabled by the timing signal $T_1$ is caused into a down-count mode by the high level output of the D flip-flop 13. The output of the up-down counter 5 is transformed into an analog signal by a DAC 6, so that the current being fed from the laser driver 8 to the laser 1 is changed in response to the analog signal. In this case, therefore, the drive current for driving the laser 1 is reduced to in turn lower the output voltage of the amplifier 11. On the turn of the output of the comparator 12 from a high level to a low level, the output of the D flip-flop 13 goes low to thereby cause the NOR gate 15 to produce a high level output. As a result, the JK flip-flop 16 is set to inhibit the up-down counter 5 from operating.

On the other hand, assume that the up-down counter 5 is enabled by the timing signal $T_1$ when the output of the comparator 12 is in a low level, i.e., when the output of the laser 1 is lower than the reference voltage Vref. Then, the up-down counter 5 is caused into an up-count mode by the low level output of the D flip-flop 13. The output of the counter 5 is converted into an analog signal by the DAC 6, and the current being fed from the laser driver 8 to the laser 1 is changed in response to the analog signal. In this case, the laser drive current and, therefore, the output voltage of the amplifier 11 is increased. As soon as the output of the amplifier 12 goes high, the output of the D flip-flop 13 goes high with the result that the up-down counter 5 is operated in the down-count mode. In this instance, since the output of the NOR gate 15 remains in a low level and the JK flip-flop 16 is not set, the up-down counter 5 remains in the enabled state. More specifically, the up-down counter 5 is not disabled when the output of the laser 1 has increased beyond teh reference voltage Vref and is disabled when it has decreased below the reference level Vref. This is successful in maintaining the laser drive current constant.

Conversely, an arrangement may be made such that the up-down counter 5 is not disabled when the output of the laser 1 has decreased below the reference voltage Vref and is disabled when it has increased above the reference voltage Vref. This is also successful in maintaining the laser drive current constant.

Specifically, in FIG. 3, the circuit elements surrounded by a dash-and-dot line 10 play the role of an edge detecting circuit which enables or disables the up-down counter 5 by detecting the change of the output of the comparator 12. As stated above, the output beam of the laser 1 is so controlled as to maintain the output voltage of the amplifier 11 constant with the reference voltage Vref as a reference (the output beam is maintained constant at all times).

Such output control means using a counter and a DAC is disclosed in, for example, Japanese patent laid-open publication Nos. 171863/1985, 174786/1986, and 174787/1986.

The above-described beam output control device has the photodetector 22 and the comparator 12 for comparing the output of the photodetector 22 and the reference signal, Vref, and controls the beam output in response to the output of the comparator 12. With this type of control device, the following procedure is available for changing the laser power. Briefly, the procedure which will be described is characterized in that the reference signal Vref applied to the comparator 12 is variable on the basis of externally derived beam output data.

Figure 4:
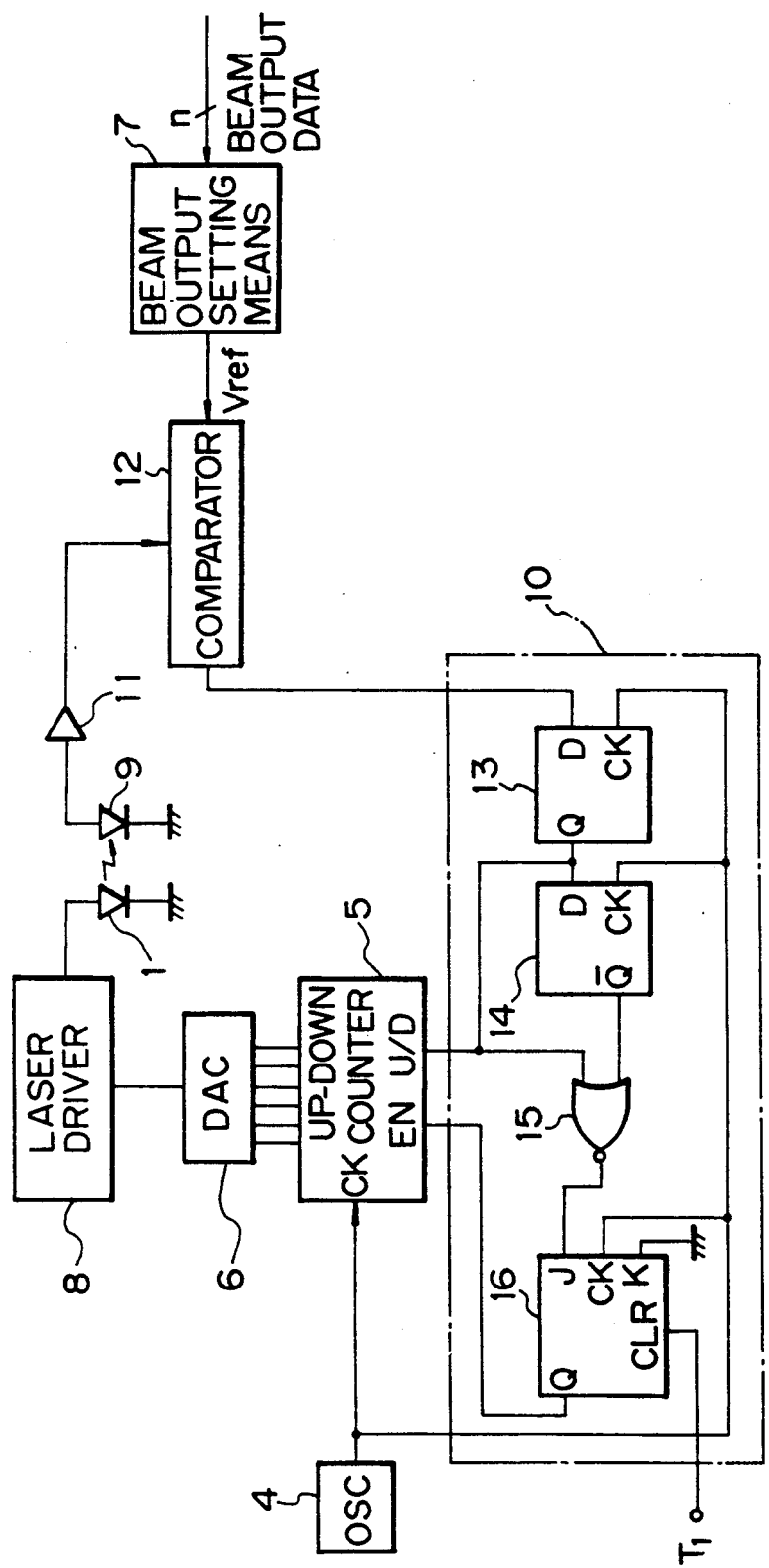
FIG. 4 is a block diagram schematially showing a circuit which variably sets a reference signal in response to externally derived output beam data.

FIG. 4 shows specific circuitry for implementing the above procedure. In the figures, similar components are designated by the same reference numerals, and redundant description will be avoided for simplicity. The beam output of the laser 1 is the beam output which appears when the output of the amplifier 11 is coincident with the reference signal Vref, as stated earlier. Hence, in the specific arrangement previously described with reference to FIG. 3, an increase in the reference signal Vref causes the beam output of the laser 1 to increase such that the output of the amplifier 11 increases with the reference signal Vref. Conversely, a decrease in the reference signal Vref causes the beam output of the laser 1 to decrease such that the output of the amplifier 11 decreases with the reference signal Vref. While the externally derived beam output data (e.g. fed from a controller built in a printer body or from an image processor) may be either analog or digital, digital data is easier to handle than analog data. For example, digital data is less susceptible to noise and easier to manipulate and hold than analog data. Concerning digital data, either one of parallel input and serial input of a plurality of bits is usable. The beam output data is held by beam output setting means 7 (or may not be held in the case that the beam output is changed all the time) to set a reference signal Vref associated therewith. This reference signal Vref is applied to the comparator 12.

Figure 5:
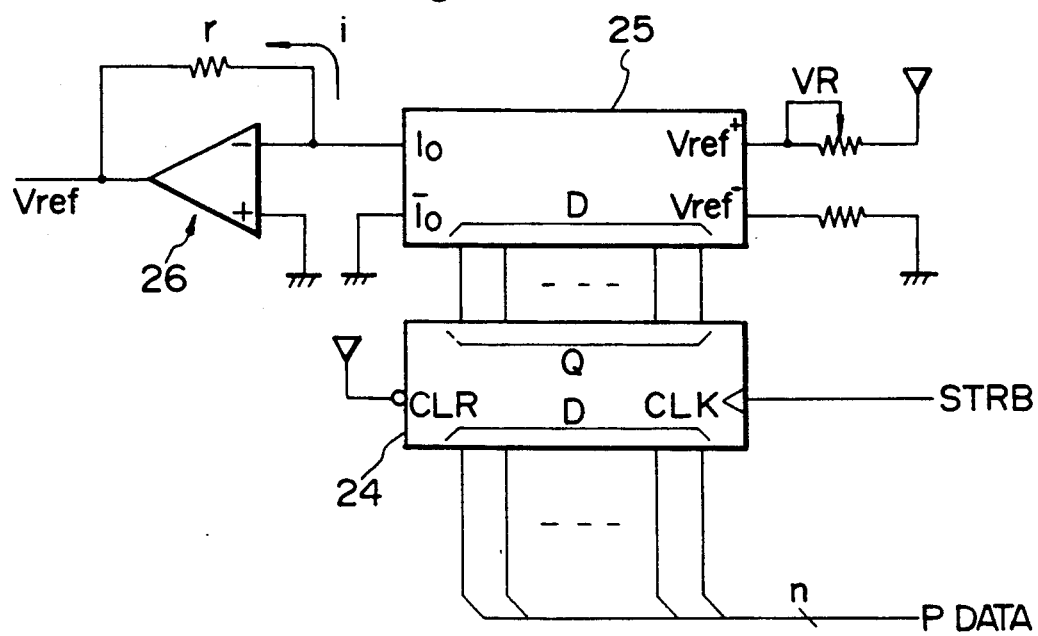
FIG. 5 is a block diagram schematically showing a specific construction of beam output setting means.

FIG. 5 shows a specific construction of the beam output setting means 7. As shown, n-bit beam output data PDATA are applied to and latched by a latch circuit 24 from the outside in synchronism with a strobe signal STRB. The data PDATA are fed from the latch circuit 24 to data of a DAC 25. Assuming that the DAC 25 is of a current output type such as HA17008, n is "8". The DAC 25 delivers a current i via an output terminal $I_o$ thereof according to the output of the latch circuit 24. When the comparator 12 is implemented as a general-purpose voltage comparator such as LM311, for example, an amplifier 26 generates a reference signal Vref=i·r on the basis of a resistance r.

Additionally, the output i of the DAC 25 when the PDATA has the maximum value is variable by a resistance VR. Hence, by selecting the resistance VR adequately, it is possible to confine the reference signal Vref to a desired variable range.

Alternatively, the beam output setting means 7 may be implemented only with the latch 24 if the comparator 12 is constituted by a digital comparator. Further, when the beam output data is in the form of an analog signal, the beam output setting means 7 shown in FIG. 5 may be replaced with an analog sample and hold circuit which per se is conventional.

Figure 6:
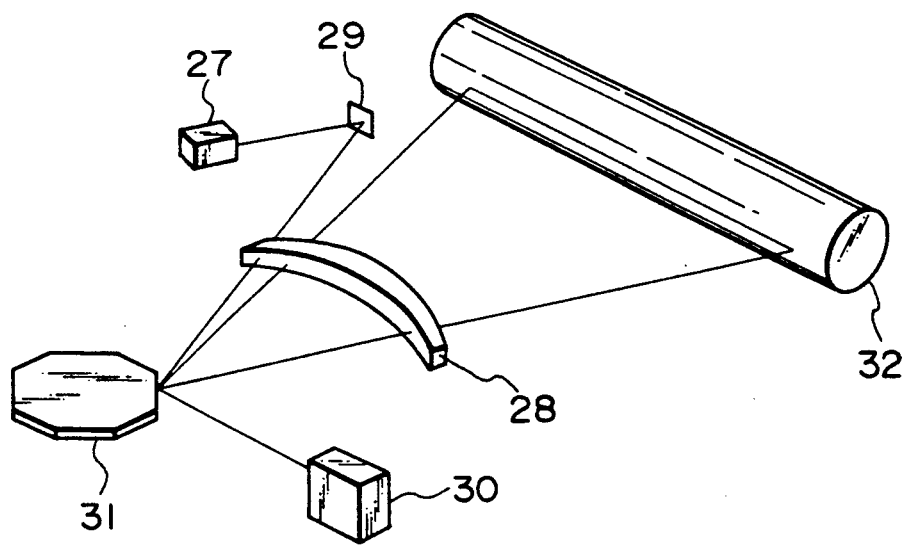
FIG. 6 is a perspective view of a laser beam printer.

A reference will be made to FIG. 6, which shows a laser printer schematically, for describing a method of setting the write start position of a laser printer. To maintain the write start position constant throughout the lines (main scanning direction), it is a common practice to use a PIN photodiode or similar beam detecting means 27. At a prescanning stage which precedes image recording, the beam detecting means 27 generates a detection signal on detecting the arrival of a laser beam at a particular position. After the beam detecting means 27 has generated such an output, the laser beam starts recording an image on the photoconductive drum 32 on the lapse of a predetermined period of time (counted in terms of video clock). In FIG. 6, the reference numeral 29 designates a mirror for steering the laser beam toward the beam detecting means 27.

In the laser printer shown in FIG. 6, a laser beam issuing from a laser 30 is steered by a rotary polygonal mirror 31 or a galvano-mirror, for example, to reach a lens 28 and then focused by the lens 28 onto a photoconductive drum 32 to scan the drum 32 in the axial direction of the latter. The laser beam has been modulated by a signal representative of text and/or graphics data. While such a laser beam repetitively scans the same line on the surface of the drum 32 in the axial direction of the latter, the drum 32 is rotated at a given rate. As a result, text and/or graphics data are formed on the surface of the drum 32 on a raster scanning basis. A prerequisite is that the time point for starting scanning be accurately detected at all times, since the modulation is effected by detecting such a time point at each time of scanning. Conventional methods, however, cannot detect the scan start time point with accuracy when the intensity of the laser beam changes, causing images on the successive scanning lines to be deviated from one another. Recently, there has been proposed a method which uses a monostable multivibrator for compensating for the errors in the scan start time point ascribable to the changes in the intensity of the laser beam. Even with such an implementation, however, it is impossible to compensate for the errors accurately since the maximum voltage of the output of a photodetector is not always the same within the pulse width setting period, i.e., it is likely to vary with the incident conditions of the laser beam to a photodetector.

Figure 7:
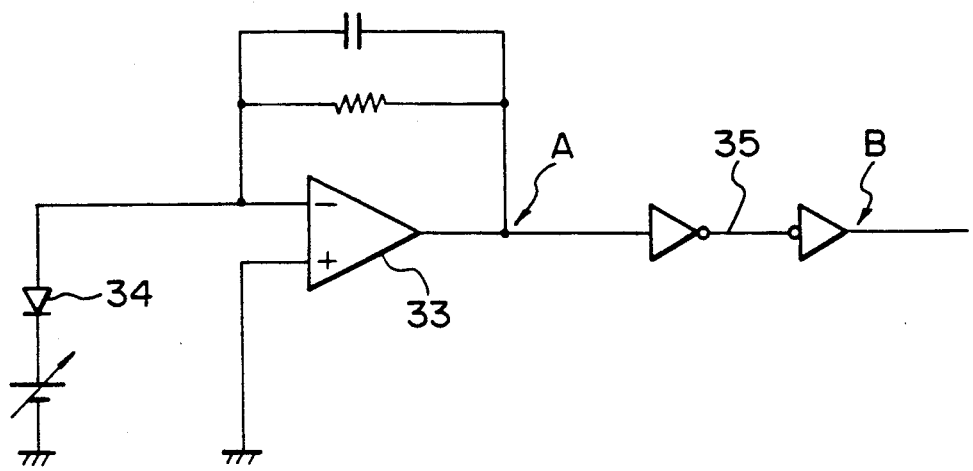
FIG. 7 is a diagram representative of a specific construction of a laser beam scanning position detecting device.

FIG. 7 shows one of conventional devices for detecting the scanning position of a laser beam. There are shown in the figure a PIN photodiode 34, a signal amplifying section 33, and a waveform shaping section 35. The PIN photodiode 34 transforms the intensity of a laser beam incident thereto into an electric signal. The signal amplifying section 33 amplifies the output signal of the photodiode 34, while the waveform shaping section 35 shapes the waveform of the amplified signal. The print start timing is determined on the basis of an output of a counter which starts counting in response to a positive- or negative-going edge of the output of the waveform shaping section 35, although not shown or described herein specifically.

Figure 8:
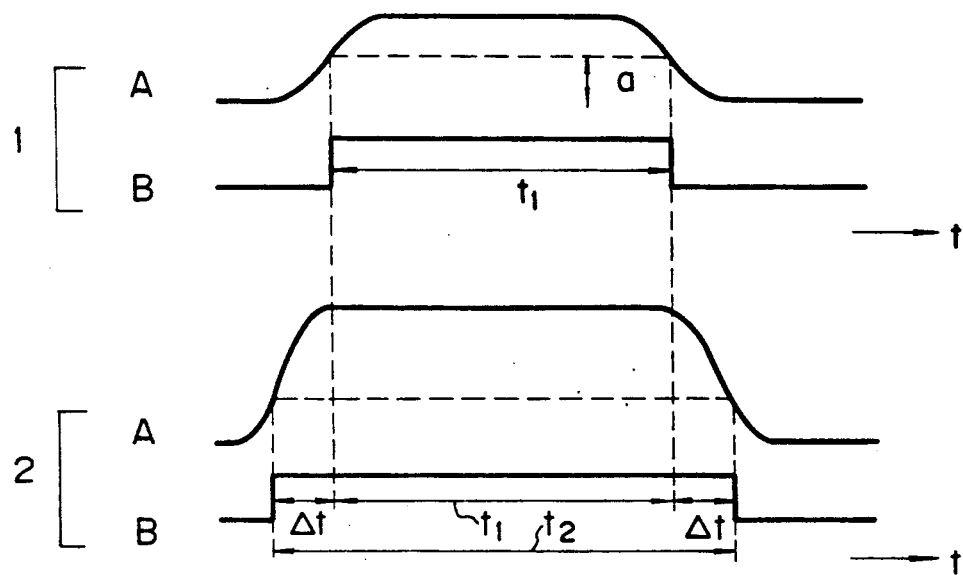
FIG. 8 is a timing chart associated with FIG. 7.

FIG. 8 is a timing chart representative of signals which appear at points A and B shown in FIG. 7. In the figure, a is the threshold voltage of the waveform shaping section 35. Specifically, when the laser beam is not intense, the signals at the points A and B vary as indicated in a portion 1; when the former is intense, the latter varies as indicated in a portion 2. As shown, the signals A and B each has a greater pulse width in the portion 2 than in the portion 1.

Figure 9:
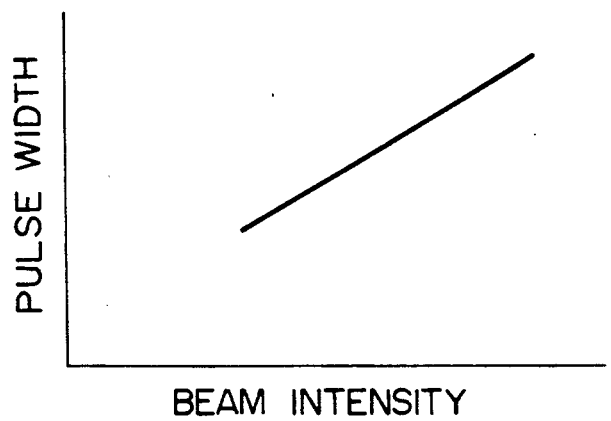
FIG. 9 is a graph representative of a specific relation between the intensity of a laser beam and the pulse width.

FIG. 9 is a graph showing a specific relation between the intensity of a laser beam and the pulse width. Assuming that the signal B shown in FIG. 8 has pulse width $t_1$ or $t_2$, the center of the laser beam passes the center of the PIN photodiode 34 at a time of $t_1/2$ or $t_2/2$. The times $t_1/2$ and $t_2/2$ are coincident with each other, as experimentally proved. Hence, when the intensity of the laser beam changes, the pulse width is increased as represented by $t_2$ of B in the portion 2, i.e. $t_2 = \Delta t + t_1 + \Delta t$. Assume that the counter starts counting at the positive-going edge of the signal B. Then, when the laser beam is intense (B, 2), the print start timing occurs $\Delta t$ earlier than when the laser beam is not intense (B, 1).

As stated above, changing the laser power in response to a change in the process conditions for the compensation purpose would slightly shift the write start position. The shift of the write start position has critical influence on the image quality when it comes to a laser color printer, as will be described hereinafter.

Figure 10:
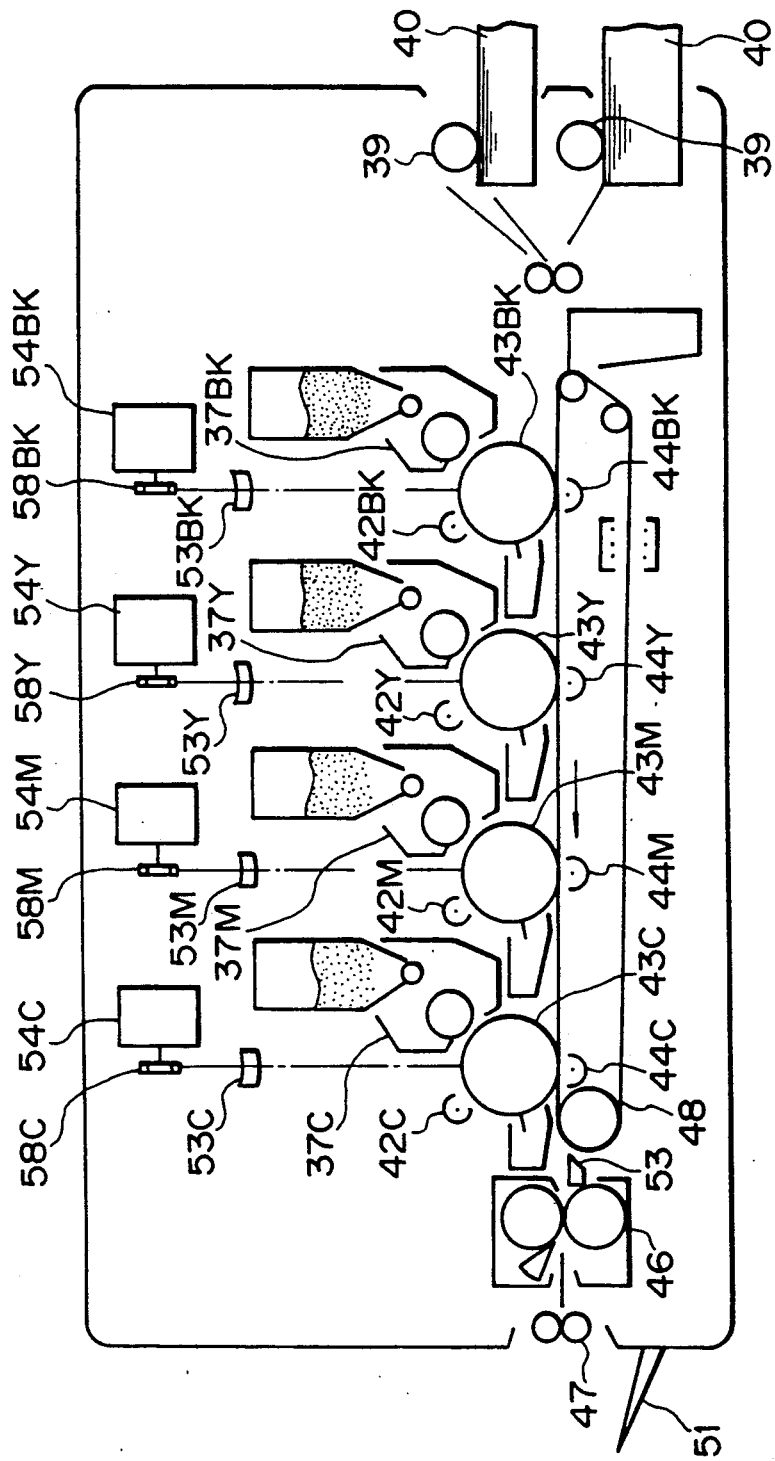
FIGS. 10 and 11 are views schematically showing a specific construction of a color printer.
Figure 11:
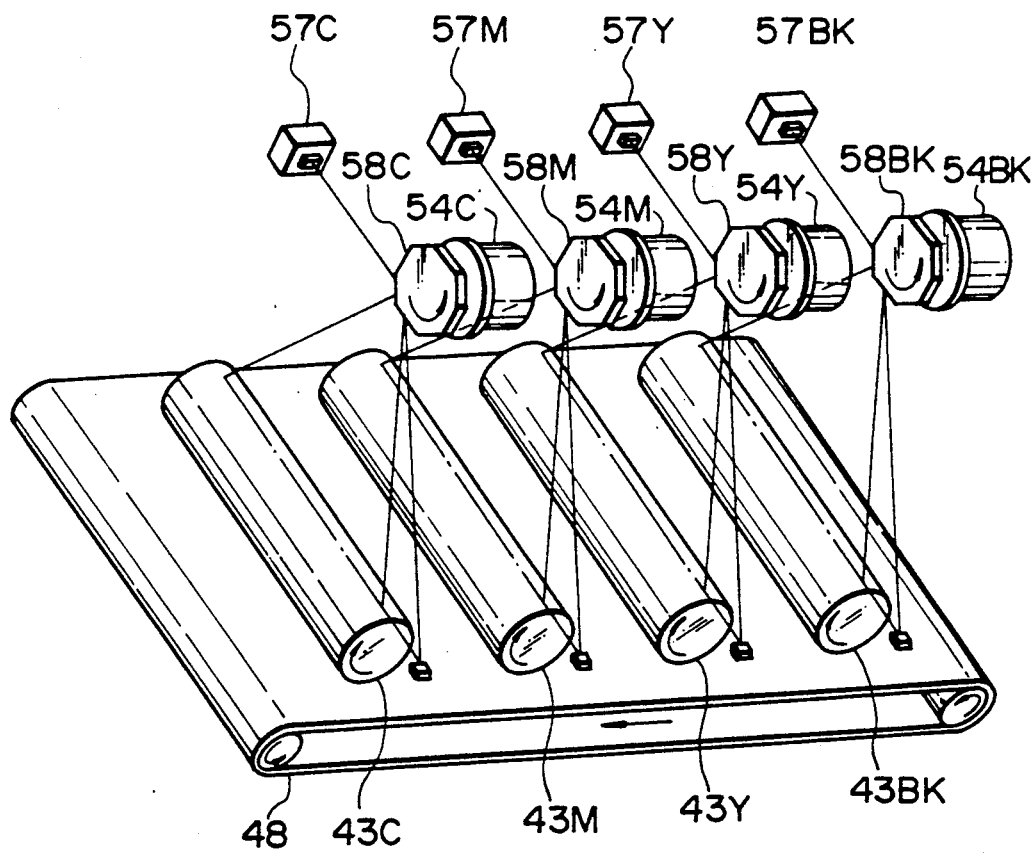

FIGS. 10 and 11 are views showing a color printer schematically. Generally, a color printer capable of outputting a full-color image separates an image into a yellow (Y) component, a magenta (M) component, and a cyan (C) component, receives signals representative of the individual color components through a suitable interface, forms monochromatic Y, M and C images in response to those signals, and then lays them one upon another to produce a full-color image. Such a color printer is operable with black (Bk) in addition to Y, M, and C. This is intended to output black which corresponds to a black printer which is customary in the printing industry. Since a color rendered by the three colors Y, M and C contains Bk corresponding to the equivalents of Y, M and C, the same color can be rendered by Bk and two of Y, M and C.

Removing the equivalents of Y, M and C corresponding to Bk is generally referred to as undercolor removal (UCR), and the replaced Bk is a black printer. In a laser color printer, UCR not only enhances color reproducibility but also reduces toner consumption, the thickness of a reproduced image, and the load particular to fixation. Generally, therefore, a toner image is formed four times and transferred four times.

In FIGS. 10 and 11, a modulated laser beam is issued from a laser 57Bk and steered by a rotary polygonal mirror 58Bk which is driven in a rotary motion by a motor 54Bk. The beam from the mirror 58Bk scans a predetermined position on a photoconductive drum 43Bk via a focusing lens 53Bk. This is called main scanning. As the polygonal mirror 58Bk rotates, the laser beam repetitively scans a line on the drum 43Bk in the same direction. At the same time, the drum 43Bk is rotated in a direction indicated by an arrow, the laser beam scans the drum 43Bk in the circumferential direction or subscanning direction also. In this manner, the laser beam scans the drum 43Bk by raster scanning. The drum 43Bk has been charged by a corona discharger 42Bk beforehand. As a result, when the modulated laser beam scans the drum 43Bk, the charge on the drum 43Bk is dissipated when subjected to predetermined optical energy. Consequently, a latent image is electrostatically formed on the drum 43Bk. A developing unit 37Bk develops the latent image by depositing a charged toner on the exposed portion of the drum 43Bk. The resulting toner image is transferred to a recording medium such as a paper sheet. The procedure described above is also executed with photoconductive drums 43Y, 43M and 43C.

A paper sheet is fed from a tray 40 by a feed roller 39 and transported by a belt 48 in a direction indicated by an arrow in the figure. The belt 48 is made of Mylar, for example, and driven by some rollers in a rotary motion. The points where the individual drums contact the belt 48 are the image transfer positions. Transfer dischargers 44Bk, 44Y, 44M and 44C are located at the image transfer positions so as to transfer the individual toner images onto the paper sheet one upon another. The paper sheet carrying the so superposed composite toner image thereon is separated from the belt 48 by a pawl 53 and driven to a fixing unit 46 to fix the toner image by heat. Thereafter, the paper sheet is driven out to a tray 51 by a roller 47.

Figure 12:
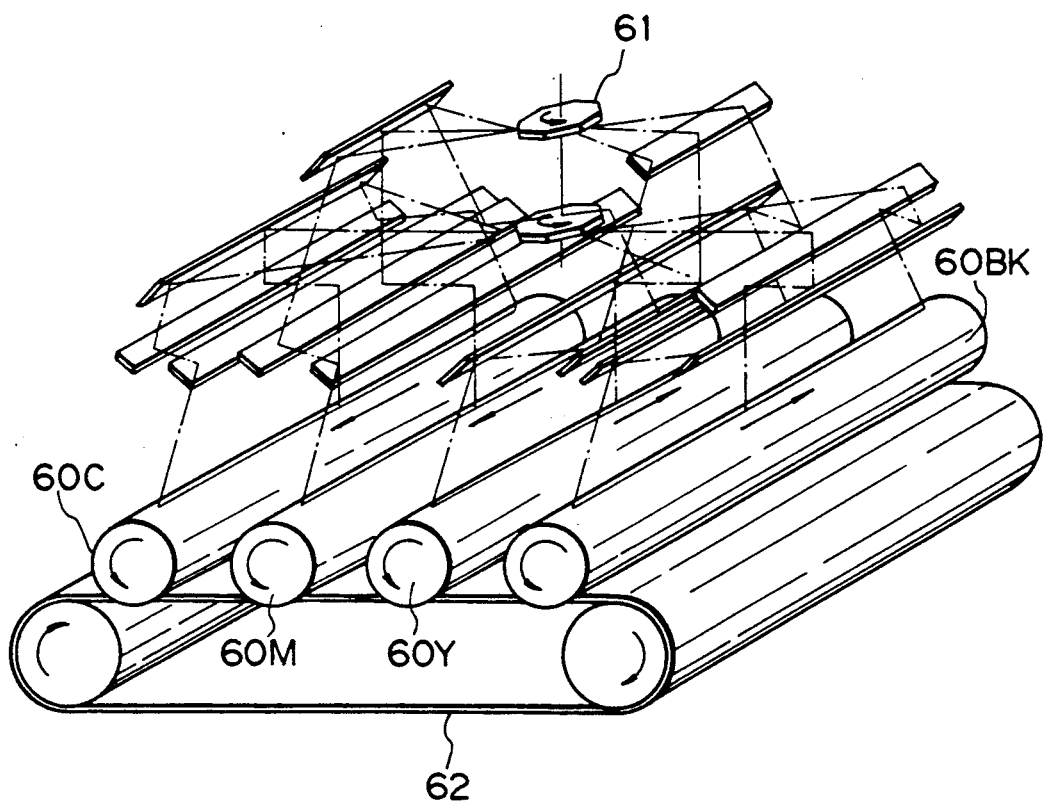
FIG. 12 is a view showing another specific construction of a color printer.

Alternatively, an arrangement may be made to deflect a plurality of laser beams by only one or two deflectors. Specifically, FIG. 12 shows such an arrangement which has photoconductive drums 60C, 60M, 60Y and 60Bk, a single deflector 61, and a transport belt 62.

The present invention contemplates to reproduce images stably without any error in the write start position even when the laser power changes.

Referring again to FIG. 1, the illustrative embodiment of the present invention has the beam detecting means 2 in addition to the various circuit elements shown in FIG. 4. In the illustrative embodiment, the print start timing changing means 3 acts on the output signal of the beam detecting means 2 in response to the reference signal Vref, thereby changing the write start position. The beam detecting means 2 may be constructed as shown in FIG. 7.

Figure 13:
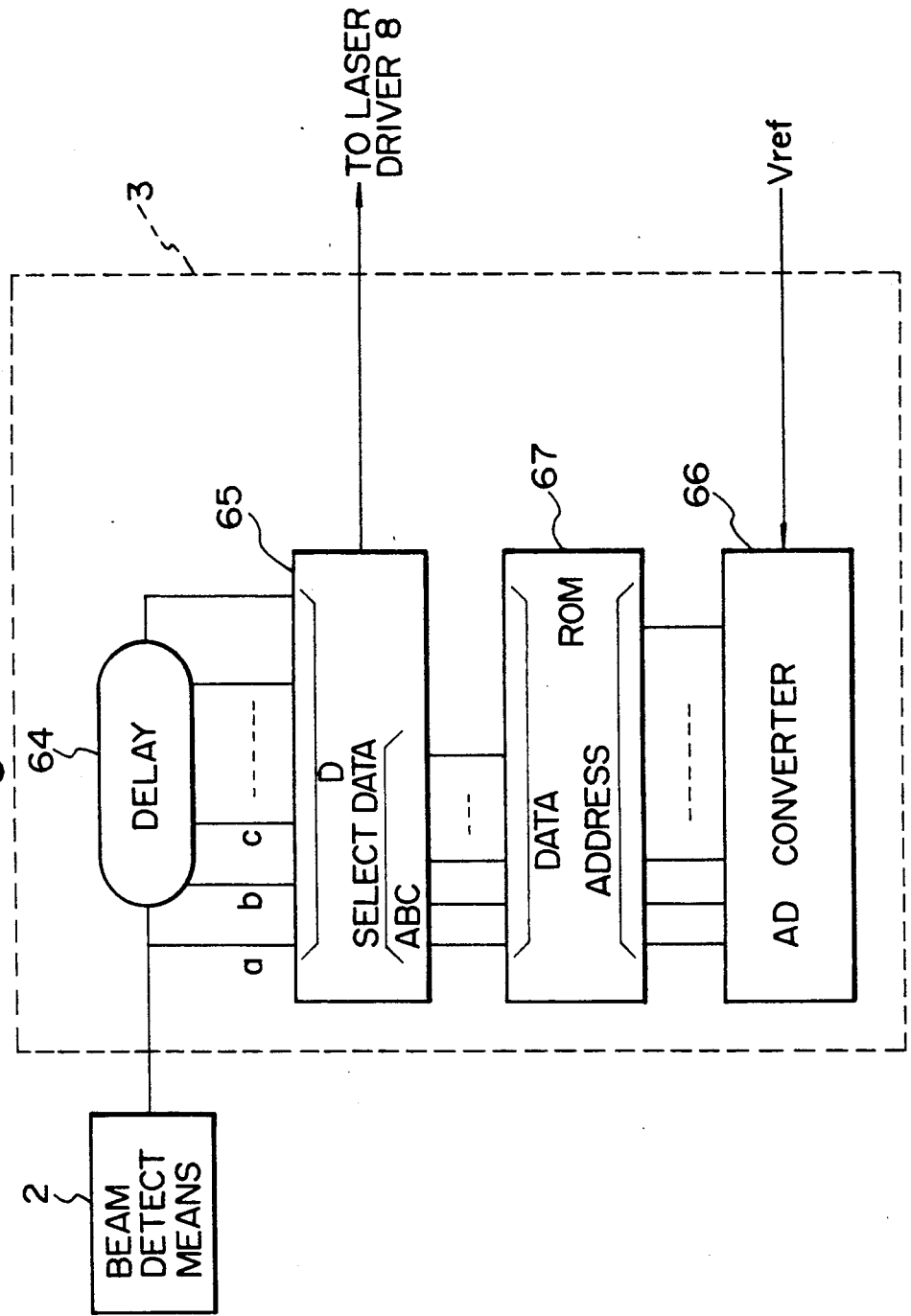
FIG. 13 is a block diagram schematically showing a specific construction of print start timing changing means.

FIG. 13 shows a specific construction of the print start timing changing means 3 which delays the output signal of the beam detecting means 2. Specifically, a delay 64 delays the output signal of the beam detecting means 2 to produce a plurality of timing signals a, b, c and so on. These timing signals are applied to a data selector 65. In response, the data selector 65 selects one of the timing signals by select data A, B, C and so on thereof and feeds it to the laser driver 8 via an output terminal Y. The laser driver 8 determines the write start timing on the basis of such an input. The select data A, B, C and so on fed to the data selector 65 are produced by, for example, transforming the reference signal into digital data by an analog-to-digital converter (ADC) 66 and manipulating the addresses of a ROM 67 by use of the digital data. The ROM 67 is not essential, but it allows a relationship other than a linear input-output relationship to be set up between the reference signal Vref and the amount of delay, as desired. An element for latching and holding the output data of the ADC 66 may be provided between the ADC 66 and the data selector 65, if necessary.

Figure 14:
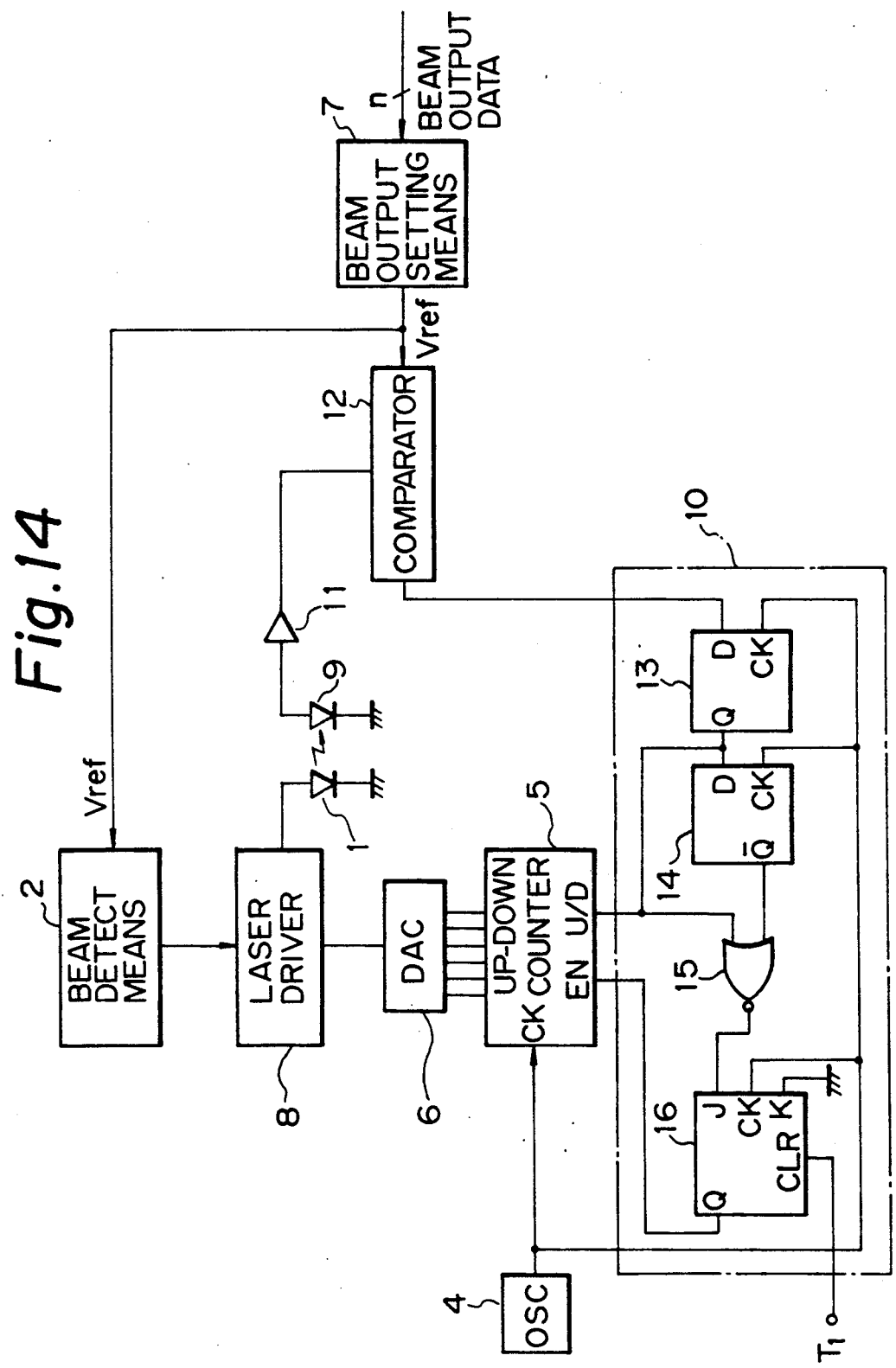
FIG. 14 is a block diagram schematically showing an alternative embodiment of the present invention.

FIG. 14 shows an alternative embodiment of the present invention. In this particular embodiment, the reference signal Vref is directly applied to the beam detecting means for the purpose of adjusting the write start timing. In the figures, similar components are designated by the same reference numerals, and redundant description will be avoided for simplicity.

Figure 15:
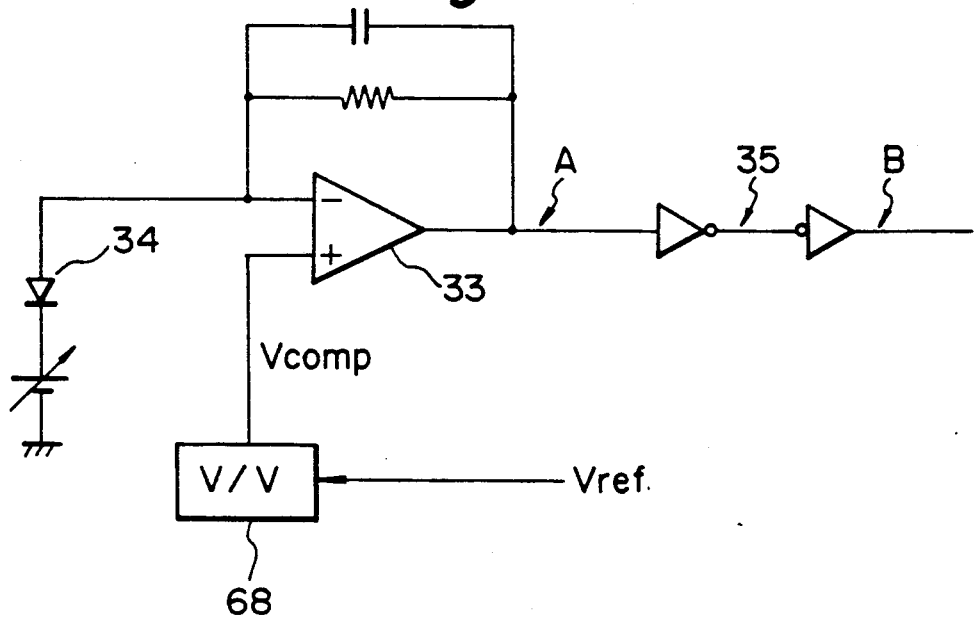
FIG. 15 is a diagram representative of a specific construction of beam detecting means included in the embodiment of FIG. 14.

FIG. 15 shows a specific construction of the beam detecting means 2 which is included in the embodiment of FIG. 14. The circuitry of FIG. 15 is essentially similar to that of FIG. 7 except that a threshold value Vcomp applied to the positive input of the amplifier 33 is variable according to the reference signal Vref. A voltage-to-voltage (VV) converter 68, although not essential, serves to set up between the reference voltage Vref and the threshold value Vcomp a functional relation:

$$Vcomp = f(Vref).$$

Figure 16:
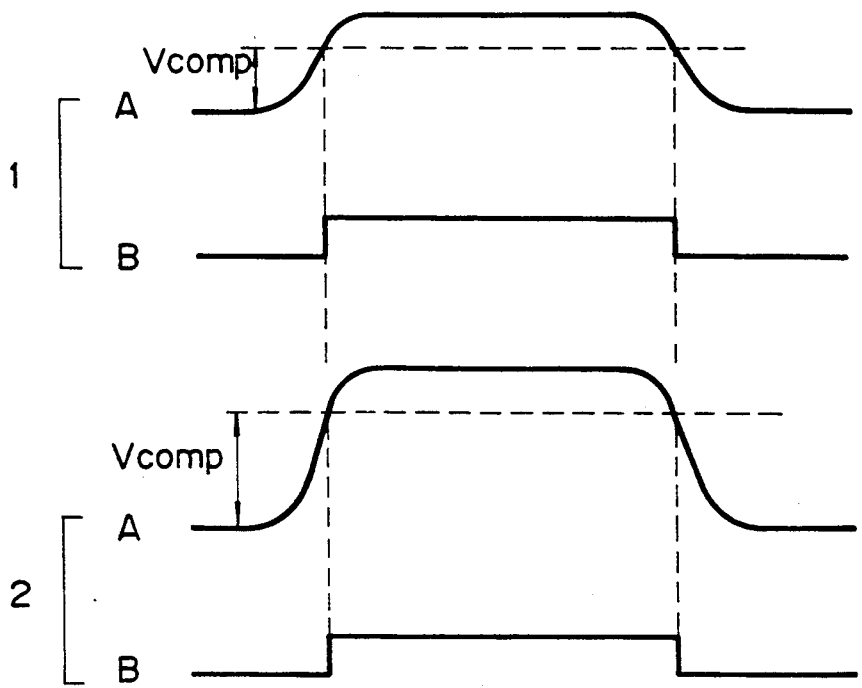
FIG. 16 is a timing chart similar to FIG. 8 and associated with FIG. 15.

FIG. 16 is a timing chart similar to FIG. 8 and useful for understanding the operation of the circuitry shown in FIG. 15. Specifically, the reference voltage Vref differs from the case wherein the laser power is weak (1, FIG. 16) to the case wherein it is strong (2, FIG. 16). The threshold value is changed as represented by Vcomp and V'comp in association with the reference voltage Vref. This allows timing signals having the same pulse width to be produced with no regard to the laser power.

Figure 17:
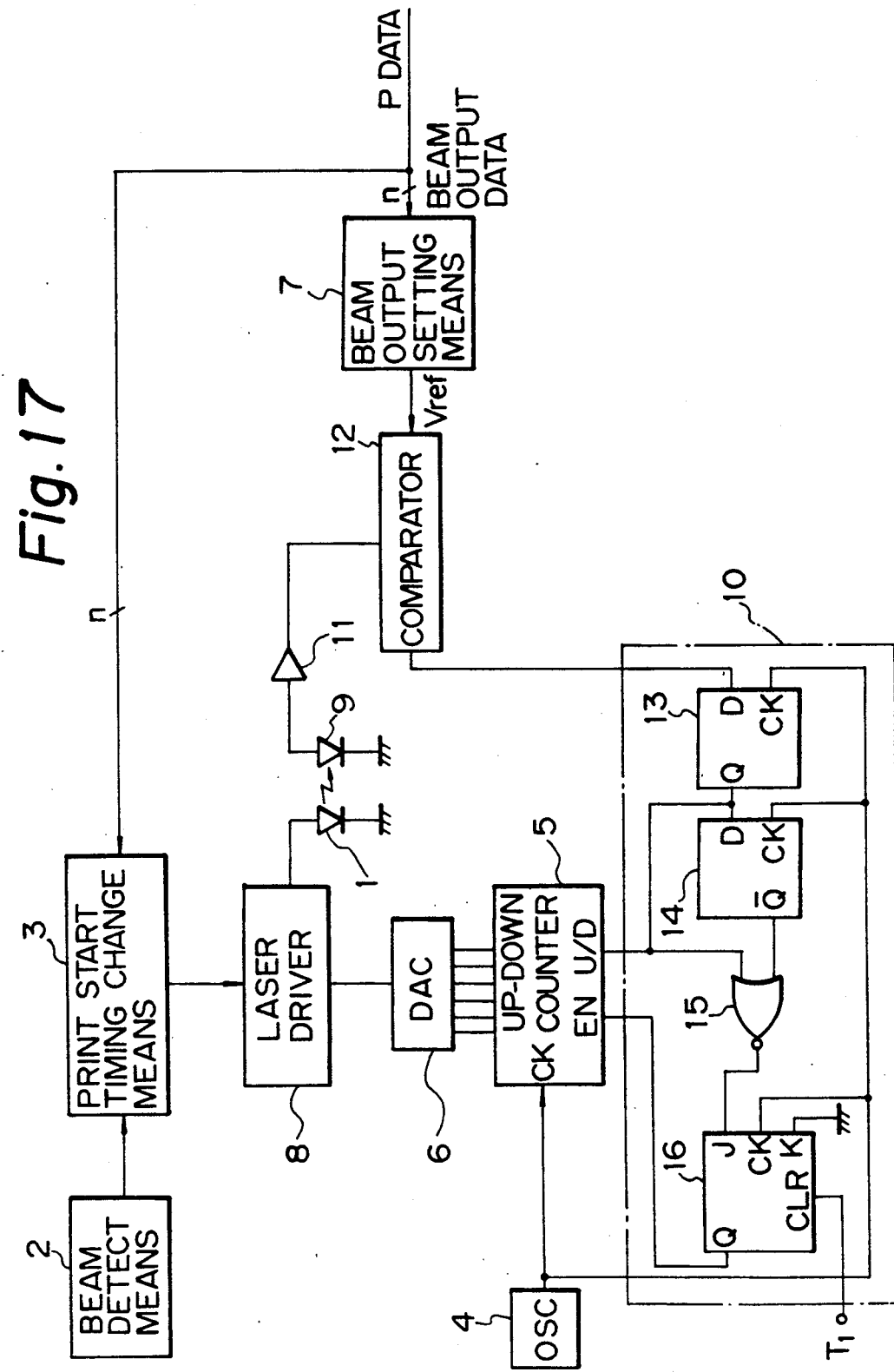
FIG. 17 is a block diagram schematically showing another alternative embodiment of the present invention.

FIG. 17 shows another alternative embodiment of the present invention which is essentially similar in construction to the embodiment of FIG. 1. In the figures, similar components are designated by the same reference numerals, and redundant description will be avoided for simplicity. In this particular embodiment, the externally derived data PDATA is applied to the print start timing changing means 3. In response, the changing means 3 acts on the output signal of the beam detecting means 2 to thereby change the write start timing. The beam detecting means 2 may have the construction shown in FIG. 7.

Figure 18:
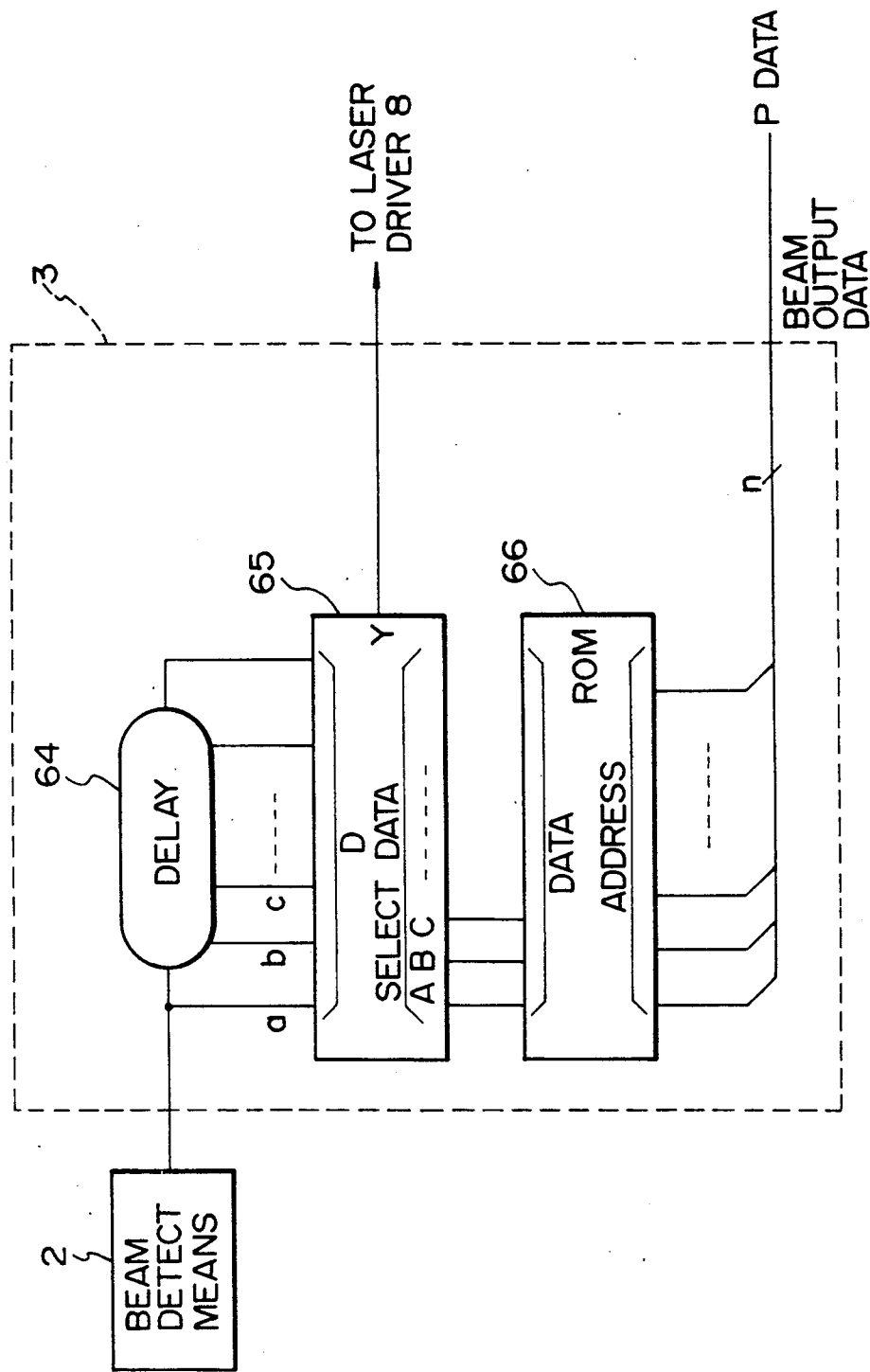
FIG. 18 is a block diagram schematically showing a specific construction of print timing changing means.

FIG. 18 shows a specific construction of the print start timing changing means 3 which delays the output signal of the beam detecting means 2. Specifically, the delay 64 delays the output signal of the beam detecting means 2 to produce a plurality of timing signals a, b, c and so on. These timing signals are applied to the data selector 65. In response, the data selector 65 selects one of the timing signals by select data A, B, C and so on thereof and feeds it to the laser driver 8 via an output terminal Y. The laser driver 8 determines the write start timing on the basis of such an input. While the select data A, B, C and so on may be implemented with the externally derived PDATA, manipulating the ROM addresses in response to PDATA to produce the select data is more feasible for general-purpose applications. This is because the ROM allows a relationship other than a linear input-output relationship to be set up between PDATA the amount of delay, as desired. An element for latching and holding PDATA may be provided at the input side or the output side of the ROM.

Figure 19:
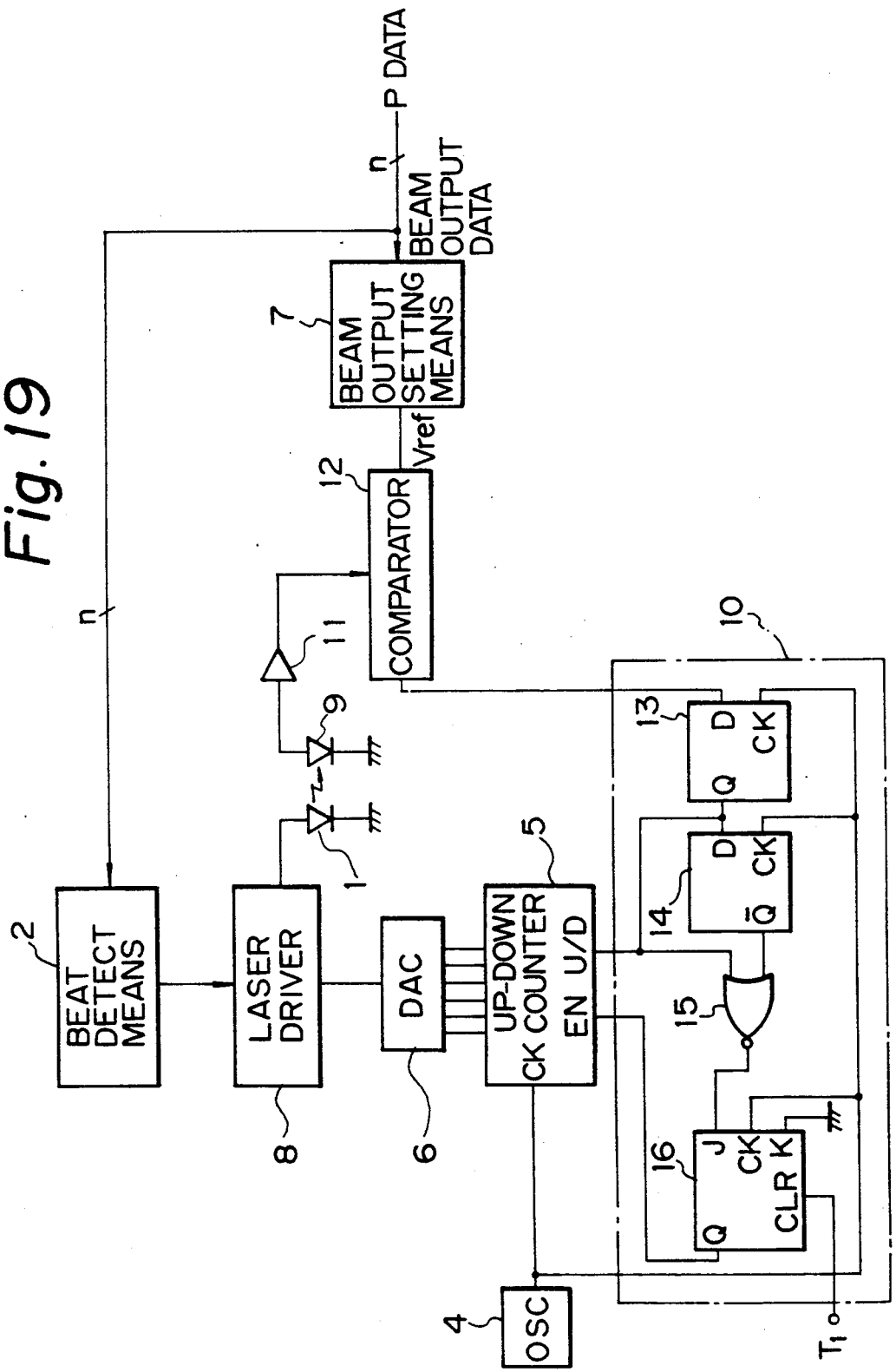
FIG. 19 is a block diagram schematically showing another embodiment of the present invention.

FIG. 19 shows another alternative embodiment of the present invention in which the data PDATA fed from the outside is directly fed to the beam detecting means 2 for the purpose of adjusting the image output timing.

Figure 20:
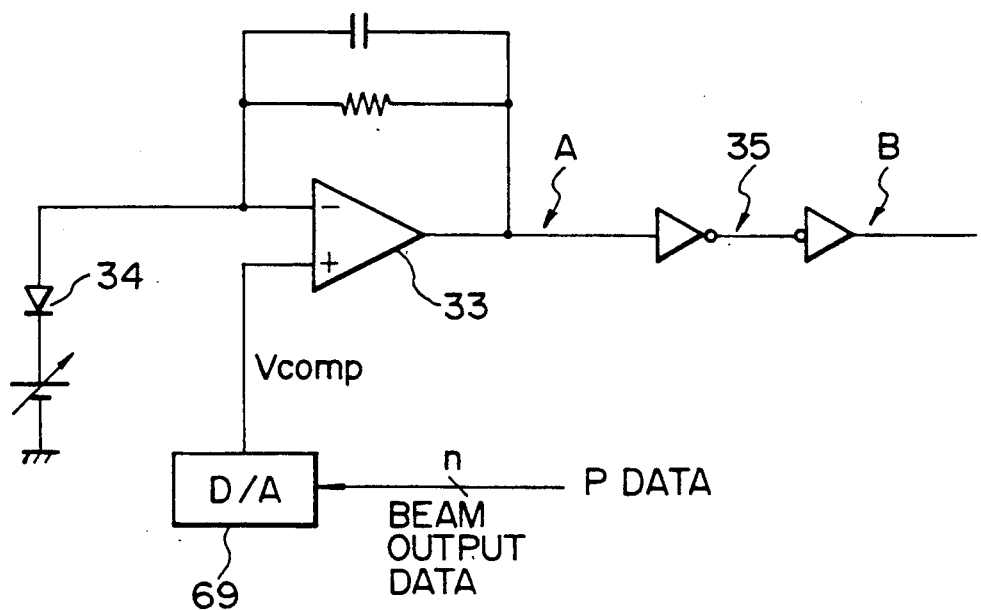
FIG. 20 is a block diagram schematically showing a specific construction of beam detecting means included in the embodiment of FIG. 19.

FIG. 20 shows a specific construction of the beam detecting means 2 included in the embodiment of FIG. 19. The circuitry of FIG. 20 is essentially similar to that of FIG. 7 except that a threshold value Vcomp applied to the positive input of the amplifier 33 is variable with the data PDATA. Specifically, a DAC 69 transforms the data PDATA (digital data) fed thereto from the outside into analog data, i.e., Vcomp. The DAC 69 may be followed by a ROM for promoting general-purpose applications, as in the arrangement of FIG. 18.

Figure 21:
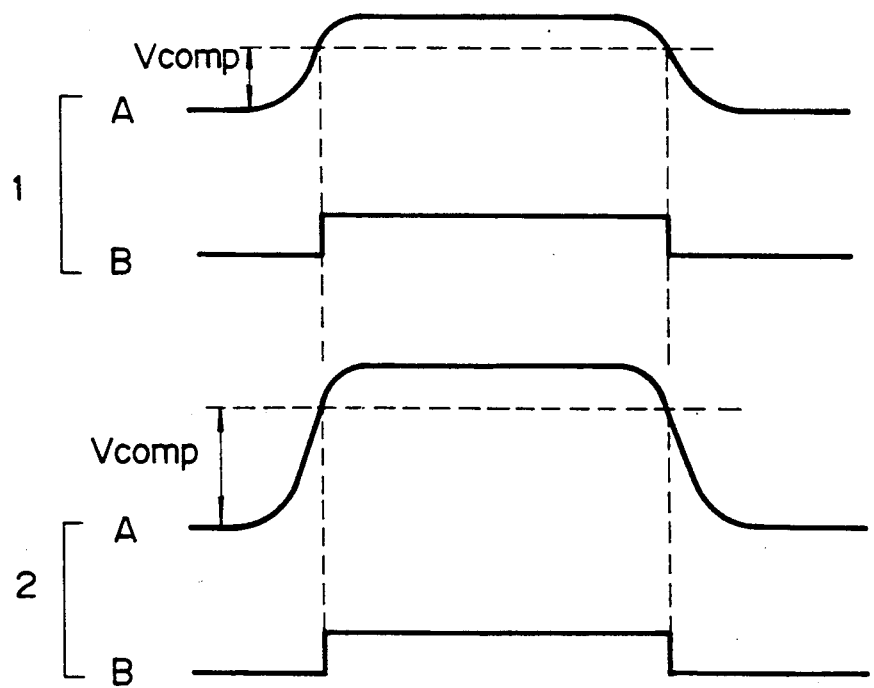
FIG. 21 is a timing chart similar to FIGS. 8 and 16 and associated with FIG. 20.

FIG. 21 is a view similar to FIG. 8 and useful for understanding the operation of the circuitry shown in FIG. 20. Specifically, the externally derived power data PDATA differs from the case wherein the laser power is weak (1, FIG. 21) to the case wherein it is strong (2, FIG. 21). The threshold value is changed as represented by Vcomp and V'comp in association with the data PDATA. This allows timing signals having the same pulse width to be produced with no regard to the laser power.

In summary, in accordance with the present inveniton, the print start timing is changed according to a reference signal so that the write start position is accurately determined with no regard to the changes in the intensity of a laser beam. Hence, there can be implemented a laser beam scanning position detecting device which insures stable production of high quality images.

Further, in accordance with the present inveniton, the print start timing is changed according to data which is fed from the outside. This is also successful in determining the write start position accurately despite the changes in the intensity of laser beam.

Various modifications will become possible for those skilled in the art after receiving the teachings of the present disclosure without departing from the scope thereof.

What is claimed is:

1. A laser beam scanning position detecting device having beam detecting means for detecting passage of a laser beam, and determining a print start timing in response to an output signal of said beam detecting means, said device comprising:
   photodetector means for detecting an output of the laser beam;
   comparator means for comparing an output signal of said photodetector means with a variable laser beam intensity reference signal;
   output control means for controlling an output of the laser beam in response to an output signal of said comparator means; and
   print start timing changing means for changing a print start timing in response to said laser beam intensity reference signal.

2. A device in accordance with claim 1, wherein said print start timing changing means delays the output signal of the beam detecting means in response to said reference signal.

3. A device as claimed in claim 2, wherein the output signal of the beam detecting means is delayed by a variable amount.

4. A laser beam scanning position detecting device having beam detecting means for detecting passage of a laser beam, and determining a print start timing in response to an output signal of said beam detecting means, said device comprising:
output control means for controlling an output of the laser beam in response to data derived externally from said output control means; and
print start timing changing means for changing a print start timing in response to the externally derived data.

5. A device as claimed in claim 4, wherein said print start timing changing means delays the output signal of the beam detecting means in response to the externally derived data.

6. A device as claimed in claim 5, wherein the output signal of the beam detecting means is delayed by a variable amount.

7. A laser beam scanning position detecting device having beam detecting means for detecting passage of a laser beam of a laser source and determining a print start timing in response to an output of said beam detecting means, said device constituted by a closed loop control means which comprises:
photodetector means for detecting an intensity of the laser beam of said laser source;
comparator means for comparing an output of said photodetector means with a variable reference;
laser beam control means for controlling the intensity of the laser beam by adjusting current applied to said laser source in response to an output of said comparator means; and
print start timing control means for controlling a print start timing in response to said intensity of the laser beam such that print start position is prevented from being shifted, independent of changes in the intensity of the laser beam.

8. A device as claimed in claim 7, wherein said print start timing control means further comprises:
beam detecting means for detecting said laser beam and for outputting a laser beam detection signal;
delay means for producing a plurality of timing signals in response to said laser beam detection signal;
converting means for converting said variable reference into a digital signal;
a read only memory having select data stored therein representing relationships between said variable reference and an amount of print start timing delay, said read only memory receiving said digital signal from said converting means and selectively outputting said select data; and
selector means for receiving said select data from said read only memory and selectively outputting one of said plurality of timing signals to said laser beam control means based upon said select data output from said read only memory.

9. A device as claimed in claim 7, wherein said print start timing control means comprises:
beam detecting means for detecting said laser beam and for outputting a laser beam detection signal;
converting means for converting said variable reference into a voltage signal using a predetermined functional relationship; and
amplifying and shaping means for amplifying and shaping said laser beam detection signal based upon said voltage signal and outputting a print start timing signal.

10. A device as claimed in claim 9, wherein said amplifying and shaping means comprises:
an amplifier receiving as inputs said laser beam detection signal and said voltage signal and producing an amplified laser beam detection signal;
a wave shaper for outputting said print start timing signal as a pulse signal having positive and negative-going edges determined when said amplified laser beam detection signal crosses a threshold voltage, said threshold voltage being a magnitude of said voltage signal.

11. A device as claimed in claim 7, wherein said starting timing control means comprises:
beam detecting means for detecting said laser beam and for outputting a laser beam detection signal;
delay means for delaying said laser beam detection signal and for producing a plurality of timing signals;
a read only memory for outputting select data stored therein in response to beam output data; and
selector means for selecting and outputting one of said timing signals from said delay means based upon said select data from said read only memory, and for outputting said selected timing signal to said laser beam control means.

12. A devices as claimed in claim 7, wherein said print start timing control means comprises:
beam detecting means for detecting said laser beam and for outputting a laser beam detection signal;
converting means for converting beam output data derived externally from said photodetector means into a voltage signal; and
amplifying and shaping means for amplifying and shaping said laser beam detection signal based upon said voltage signal to produce a print start timing signal.

13. A device as claimed in claim 12, wherein said amplifying and shaping means comprises:
an amplifier receiving as inputs said laser beam detection signal and said voltage signal and producing an amplified laser beam detection signal; and
a wave shaper for outputting said print start timing signal as a pulse signal having positive and negative-going edges determined when said amplified laser beam detection signal crosses a threshold voltage, said threshold voltage being a magnitude of said voltage signal.

* * * * *